United States Patent
Albrecht

(10) Patent No.: US 8,581,145 B2
(45) Date of Patent: Nov. 12, 2013

(54) SYSTEM AND METHOD FOR TRACKING WELDING-TYPE PARAMETERS, MACHINE SETUP AND JOB PACKET CODING FOR WORKFLOW

(75) Inventor: Bruce Albrecht, Grayslake, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 1548 days.

(21) Appl. No.: 11/615,536

(22) Filed: Dec. 22, 2006

(65) Prior Publication Data

US 2008/0149607 A1 Jun. 26, 2008

(51) Int. Cl.
*B23K 9/32* (2006.01)
*B23K 9/10* (2006.01)

(52) U.S. Cl.
CPC ............ *B23K 9/1006* (2013.01); *B23K 9/1043* (2013.01); *B23K 9/32* (2013.01)
USPC .................................. 219/130.1; 219/137 PS

(58) Field of Classification Search
USPC ......... 219/130.1, 130.5, 132, 137 PS; 700/83
See application file for complete search history.

(56) References Cited

U.S. PATENT DOCUMENTS

| | | | |
|---|---|---|---|
| 2,277,643 A | | 3/1942 | Holmes |
| 2,317,590 A | * | 4/1943 | Compere .................... 434/150 |
| 2,706,962 A | * | 4/1955 | Kebbon ....................... 116/221 |
| 3,022,582 A | * | 2/1962 | Pitt ............................... 434/304 |
| 4,019,737 A | * | 4/1977 | Witzel ........................... 273/277 |
| 4,973,821 A | * | 11/1990 | Martin ..................... 219/130.51 |
| 5,831,240 A | | 11/1998 | Katooka et al. |
| 6,051,806 A | | 4/2000 | Shikata et al. |
| 6,138,927 A | * | 10/2000 | Spear et al. .................... 239/666 |
| 6,417,498 B1 | * | 7/2002 | Shields et al. .................. 219/521 |
| 6,686,900 B1 | * | 2/2004 | Levy et al. ..................... 345/156 |
| 2004/0026391 A1 | * | 2/2004 | Oberzaucher et al. ...... 219/130.1 |

FOREIGN PATENT DOCUMENTS

| | | | |
|---|---|---|---|
| EP | 521777 A1 | * | 1/1993 |
| EP | 1457104 | | 9/2004 |
| GB | 592668 | | 9/1947 |
| GB | 1174089 | | 12/1969 |
| GB | 2208479 A | * | 4/1989 |
| JP | 55022456 A | * | 2/1980 |
| JP | 06007549 | | 1/1994 |

OTHER PUBLICATIONS

International Search Report; PC/US2007/081710; 2 pages.

* cited by examiner

*Primary Examiner* — Henry Yuen
*Assistant Examiner* — Thien S Tran
(74) *Attorney, Agent, or Firm* — Quarles & Brady LLP

(57) ABSTRACT

A system and method for identifying, recording, and storing specific settings for an interface device of a welding-type system includes a bezel forming a marking surface that extends about a portion of a periphery of the interface device to display user markings and allow the markings to be selectively erased. The marking surface may be designed to receive color-coded markers that engage the marking surface through suction, magnetism, or peg-and-receptacle couplings to indicate desired settings of the interface device to perform a specific welding-type process. Additionally, if the interface device is a dial, a pointer may be coupled with the dial that is movable independently from the dial to indicate a desired dial setting.

7 Claims, 3 Drawing Sheets

SYSTEM AND METHOD FOR TRACKING WELDING-TYPE PARAMETERS, MACHINE SETUP AND JOB PACKET CODING FOR WORKFLOW

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding-type systems and, more particularly, to a system and method for tracking or identifying welding-type parameters for machine set up and workflow through a welding-type process. A plurality of components is provided that facilitate identifying and recording operational parameters and guiding an operator through a welding-type process.

Welding-type systems, such as welding systems, plasma cutting systems, induction heating systems, and the like, include a complex set of components. For example, welding systems often include a power source, a plurality of cables, and a welding gun or torch and may also include wire feeders, gas sources, and many other components. Likewise, plasma cutters typically include a power source, cutting torch, gas source, and a variety of cables that connect these components. Not only must such components be coupled together correctly to perform a welding-type process, operational settings, such as voltage, wire feed speed and the like, must be correctly selected for the particular welding-type process being performed and the workpiece on which the process is being performed. Accordingly, welding-type processes require skilled operators, often with years of experience.

However, when an operator has yet to gain the requisite experience or when a skilled operator is required to perform an unfamiliar process or use an unfamiliar welding-type system, proper selection and coupling of components and proper selection of operational parameters can be a difficult, if not daunting, task. Accordingly, in some cases record books or charts are used to record a listing of operational parameters for a given welding-type system when performing a particular welding-type process. The books or charts are sometimes associated with a particular welding-type system or, in some instances, operators use markers to write directly on the welding-type system. Accordingly, systems such as the Miller Mark VI available from Miller Electric Mfg. Co. have been developed that include an individual dry erase board that is attached to the welder. While such systems for recording operational parameters are useful, they do not aid in the proper identification and assembly of the individual components of the welding-type system and they require the operator to properly correlate the recorded operational parameters to specific user interface settings.

Therefore, it would be desirable to have a system and method for tracking or identifying welding-type parameters and workflow through a welding-type process. Specifically, it would be desirable to have a system and method for directly identifying proper components, settings and workflow for a given welding-type process and for directly recording and correlating desired operational parameters for the welding-type process to specific user interface settings.

BRIEF SUMMARY OF THE INVENTION

The present invention overcomes the aforementioned drawbacks by providing a system and method for marking specific settings for each user interface device of a welding-type system. Specifically, a variety of marking systems and parameter recording systems are provided that are coupled directly with each specific user interface device. For example, the provided systems aid in recording and indicating settings including but not limited to wire feed speed on a wire feeder and the appropriate voltage on the power supply.

In accordance with one aspect of the present invention, a welding-type system is disclosed that includes a housing forming an enclosure and a power supply arranged within the enclosure to deliver welding-type power during a welding-type process. The welding-type system also includes a user interface having a user interface device configured to select operational parameters of the welding-type process. Furthermore, the welding-type system includes a bezel forming a marking surface that extends about at least a portion of a periphery of the interface device to display user markings and allow the markings to be selectively erased.

In accordance with another aspect of the present invention, a welding-type system is disclosed that includes a housing forming an enclosure and a power supply arranged within the enclosure to deliver welding-type power during a welding-type process. The welding-type system also includes a user interface having at least one dial configured to select operational parameters of the welding-type process. A pointer is coupled with the dial and is independently movable with respect to the dial to indicate a desired dial setting.

In accordance with yet another aspect of the invention, a welding-type system is disclosed that includes a housing forming an enclosure and a power supply arranged within the enclosure to deliver welding-type power during a welding-type process. The welding-type system also includes a user interface having a user interface device configured to select operational parameters of the welding-type process. A marking surface extends along a periphery of the interface device that is designed to receive color-coded markers that engage the marking surface through suction, magnetism, or peg-and-receptacle couplings to indicate desired settings of the interface device to perform the welding-type process.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
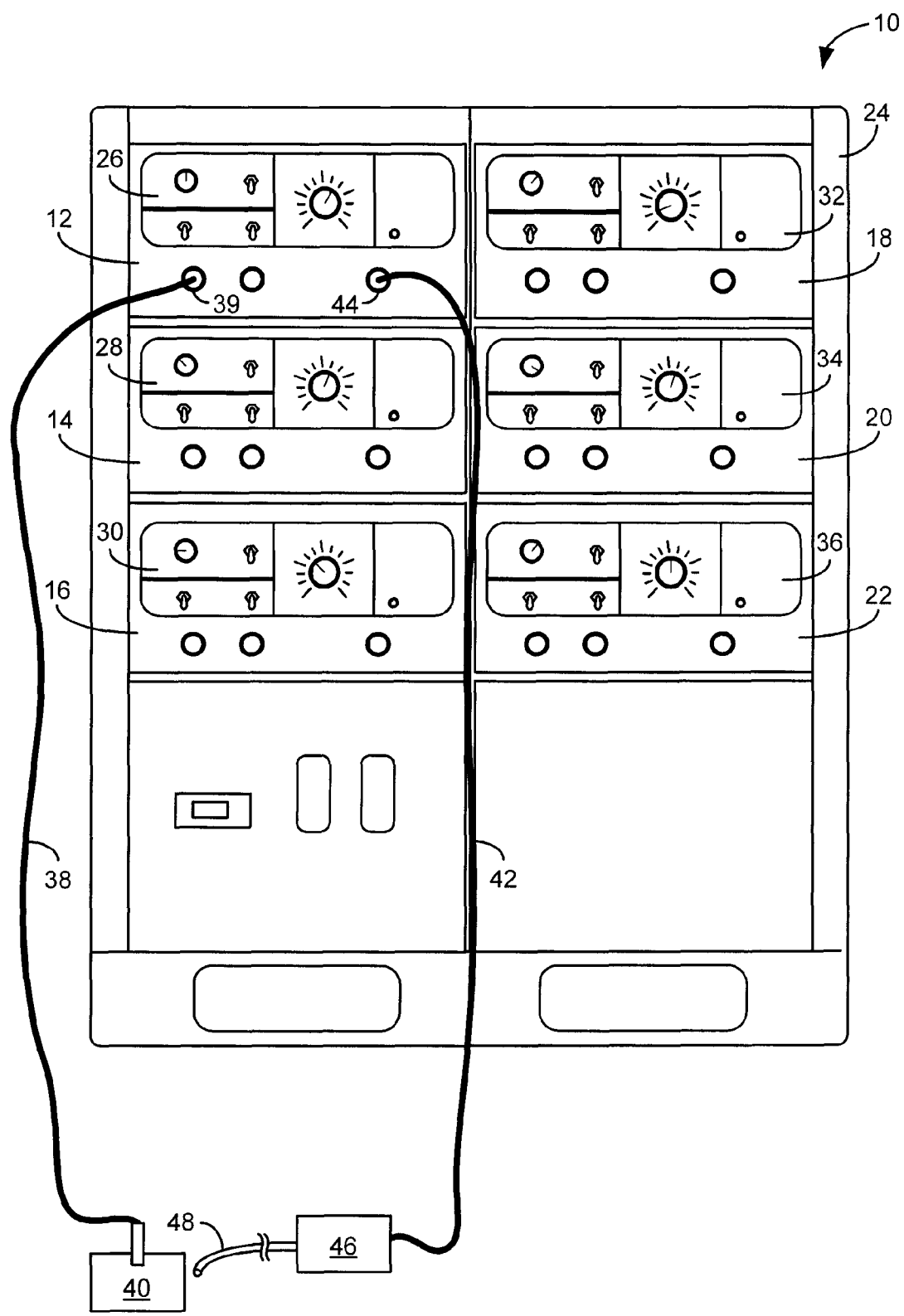
FIG. 1 is a front elevational view of a welding-type system including a workflow/parameter tracking system in accordance with the present invention.

Referring now to FIG. 1, a multiple-operator arc welding system 10 is shown that includes six welding modules 12-22 arranged in a common housing 24 forming an enclosure. The multiple-operator arc welding system 10 is just one example of a welding-type system with which the present invention can be incorporated. Specifically, the present invention is equivalently applicable to single operator welding-type systems of any modality. Similarly, the present invention is equivalently applicable to other welding-type systems that utilize welding-type power, such as plasma cutters and induction heaters. Therefore, though the present invention will be described with respect to the multiple-operator arc welding system 10 of FIG. 1 and the user interfaces included with such systems, the present invention is equivalently applicable to any other welding-type system or modality.

Each welding module 12-22 of the multiple-operator arc welding system 10 is designed to operate as an independent welding power source. Therefore, each welding module 12-22 includes a respective user interface 26-36 designed to allow operator selection of operational parameters for a welding-type process.

A negative weld cable 38 extends from a negative weld terminal 39 of a welding module 12 and is clamped to a workpiece 40. Additionally, a positive weld cable 42 extends from a positive terminal 44 of the welding module 12 to a remote wire feeder 46 and welding torch 48. Using this arrangement, a welding-type process, such as a metal inert gas (MIG) welding-type process, can be performed. The user interface 26 of the welding module 12 and/or wire feeder 46 are used to select the operational parameters of the welding-type process. As will be described, the present invention provides a system and method for recording and tracking the proper operational parameters, components of the welding-type system, and/or workflow procedures for a given welding-type process performed on a specific welding-type system or welding module of a multiple-operator welding system 10.

Figure 2:
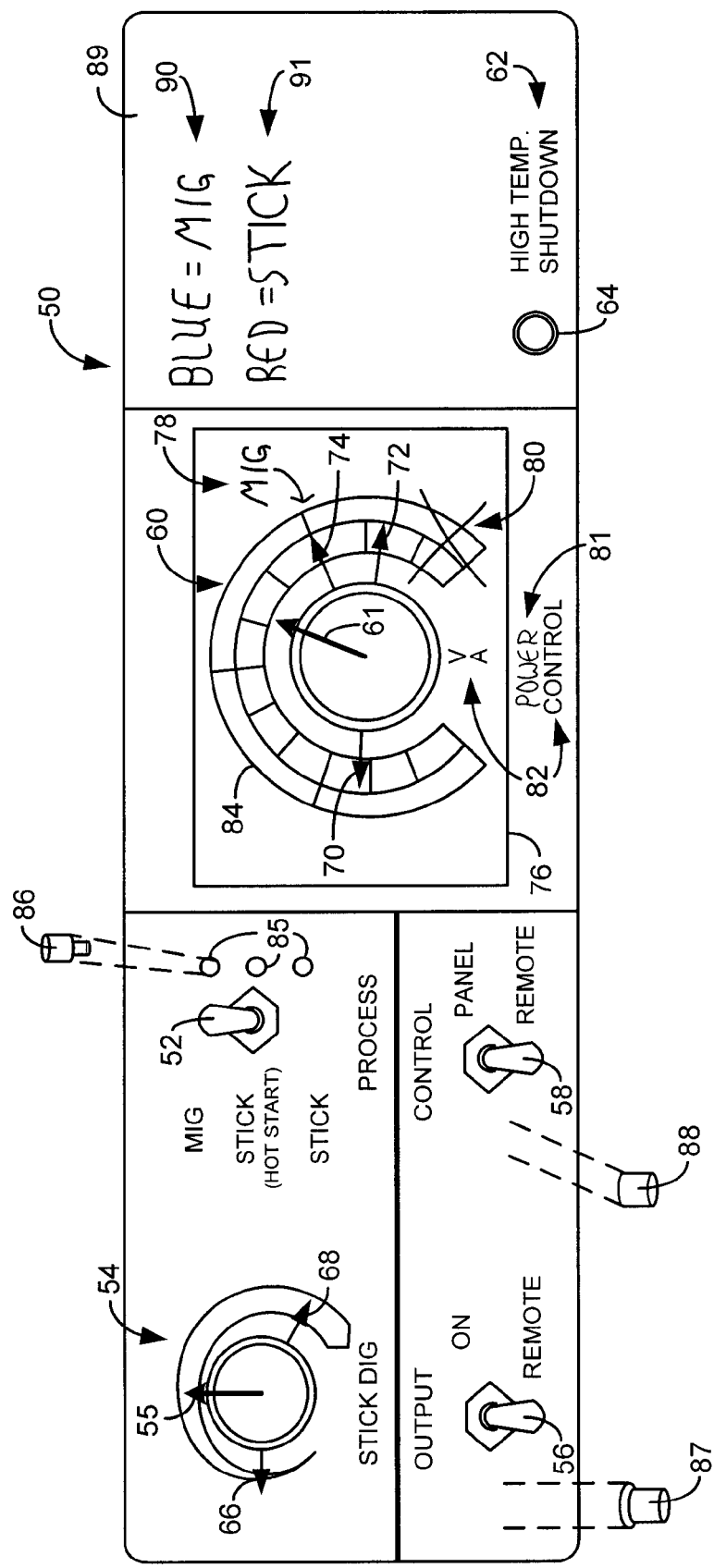
FIG. 2 is a detailed front elevational view of a user interface for the welding-type system of FIG. 1 including the workflow/parameter tracking system in accordance with the present invention.

Referring now to FIG. 2, an exemplary user interface 50 for controlling a welding-type system, such as an individual welding module 12-22 of the multiple-operator welding system of FIG. 1, is shown. The user interface 50 includes a plurality of interface devices. Specifically, a welding-type process selection switch 52 is included that, in the illustrated user interface 50, allows selection between a MIG welding process, a stick welding process with hot start, and a stick welding process without hot start. A dig depth dial 54 is included having a setting pointer 55 for controlling a dig depth when the stick welding process is selected. Additionally, an output selection switch 56 and a control selection switch 58 are provided that allow an operator to select between controlling the power output parameters and other control parameters from either the user interface 50 arranged on the individual welding module 12-22 of FIG. 1 or, as will be described with respect to FIG. 3, at a remote location, such as through a wire feeder user interface. The user interface 50 also includes a power output control dial 60 having a setting pointer 61 and an alert panel 62 that includes a high temperature shutdown indicator 64.

The above-described user interface devices are simply exemplary user interface devices. That is, the systems and methods for tracking and recording components, operational parameters, and workflow that will be described below may be used with a wide variety of user interface devices. For example, while the above-described user interface 50 includes dials, switches, and indicators, it is also contemplated that buttons, sliders, touch screens, and other user interface devices may be included.

One system for tracking and recording operational parameters includes wands or pointers 66, 68, 70, 72 that are coupled with the dials 54, 60. In one arrangement, it is contemplated that a pair of dials may be coupled with each dial 54, 60. In this arrangement, one pointer 66, 70 functions as a minimum setting tracking pointer and the other pointer 68, 72 functions as a maximum setting tracking pointer. That is, the minimum setting tracking pointers 66, 70 are configured to automatically record the minimum setting to which the dial 54, 60 has been set. Specifically, as the dials 54, 60 are rotated toward a minimum value, the minimum setting tracking pointers 66, 70 move to mirror the dial setting pointers 55, 61 and remain in that minimum position even after the dial 54, 60 has be rotated away from the minimum value. That is, the minimum setting tracking pointers 66, 70 are independent from the dials 54, 60 and only interact with the dials 54, 60 when a new minimum setting is being made by an operator.

Additionally, an operator may choose to move the minimum setting tracking pointers 66, 70 from the last recorded minimum setting and, in some cases, may use the minimum setting tracking pointers 66, 70 to create a minimum stop setting. That is, it is contemplated that the minimum setting tracking pointers 66, 70 may be locked in a particular position to create a minimum setting stop below which the dials 54, 60 cannot be set. Furthermore, it is contemplated that the minimum setting tracking pointers 66, 70 may be controlled only by manual settings. In this case, the minimum setting tracking pointers 66, 70 are not automatically moved to track a minimum setting of the dials 54, 60 and function only as an operator-selected reference setting.

The maximum setting tracking setting pointers 68, 72 are configured to function in a manner that is similar to the above-described minimum setting tracking pointers 66, 70. That is, it is contemplated that the maximum setting tracking setting pointers 68, 72 are independent from the dials 53, 60 but are configured to automatically move with the dial 54, 60 to a newly selected maximum setting. However, it is also contemplated that the maximum setting tracking setting pointers 68, 72 may be configured to only move in response to manual settings.

Beyond the above-described minimum and maximum setting tracking pointers 66-72, it is contemplated that additional pointers 74 may be included. These pointers 74 are configured to record specific manually selected settings. Such pointers 74 for recording particular user-selected settings are particularly useful when coupled with a marking surface 76.

The marking surface 76 extends about a periphery of the power output control dial 60 to form a bezel and is configured to allow an operator or user to make markings 78, 80, 81 thereon that may be selectively erased. For example, an operator can create markings 78 on the marking surface 76 that indicate the relevance of a particular pointer 74, such as a desired power output setting when performing MIG welding using a particular welding system. Additionally, it is contemplated that the marking surface 76 may include traditional settings indicators, such as textual labels 82 or dial setting gradients 84. Accordingly, as illustrated, an operator can augment the traditional settings indicators 82, 84, such as by creating a marking 80 that extends over a portion of the dial setting gradient 84 to indicate that a particular portion of the dial setting should not be used. Similarly, it is contemplated that an operator could augment textual labels 82 by creating a marking 81 that further clarifies or annotates a textual label 82.

It is contemplated that the marking surface 76 may be formed by a dry erase marker board or similar surface that can be erasably marked with a dry erase marker, chalk, or grease marker. Alternatively, it is contemplated that the marking surface 76 may be formed by a touch-responsive display element that displays a mark in response to a touch from a stylus or a user's hand. In any case, the marking surface 76 extends along a periphery of the interface devices in the user interface 50 to display user markings that can be selectively erased.

In addition to marks 78, 80, 81 that are hand written on the marking surface 76, it is contemplated that a variety of marker elements may be used to record and indicate settings, configurations, and/or workflows. For example, it is contemplated that portions of the user interface 50 may include a plurality of holes 85 that are designed to receive pegs 86. The pegs 86 can be arranged in particular holes 85 to indicate a desired setting of particular interface device. As illustrated, the holes 85 may be arranged proximate to a switch 52, such that the peg 86 indicates a desired position of the switch 52. Additionally, it is contemplated that the holes 85 may be arranged proximate to the dials 54, 60 or other interface devices to indicate desired settings in a similar manner. Furthermore, as will be described below, the pegs 86 may be color coded to indicate that the desired settings correspond to a particular welding-type process or to particular components of the welding-type system.

Similarly, it is contemplated that the periphery of the user interface devices 52, 54, 56, 58, 60, 62 may be substantially continuous to receive suction indicators 87 or have a substantially high permeability to receive magnetic indicators 88. In a manner similar to the hole 85 and peg 86 system described above, the suction indicators 87 and the magnetic indicators 88 can be used to indicate desired settings and may be color coded to indicate that the desired settings correspond to a particular welding-type process or to particular components of the welding-type system.

As addressed above, to further aid in correctly configuring a welding-type system for a particular welding-type process, it is contemplated that the markings 78, 80, 81, indicators 86, 87, 88, and/or components of the welding-type system may be color coded to facilitate proper selection of components and proper workflow when performing the particular welding-type process.

For example, it is contemplated that an additional marking surface 89 may be included for general notes, such as color coding information 90, 91. In the illustrated example, the marking surface 89 includes operator marks 90, 91 indicating that marks that are in "blue" correspond to information relevant to MIG welding processes and marks that are in "red" correspond to information relevant to stick welding processes.

Beyond color coded marks written on the user interface 50, it is contemplated that individual components of the welding-type system may be color coded and color coded setup and workflow reference guides may be included. For example, in the welding-type system 10 illustrated in FIG. 1, components such as the wire feeder 46 and welding torch 48 may include blue marks to indicate that these components are to be used with MIG welding processes. Continuing with the example of a MIG welding process, after assembling the components having blue marks, the operator then arranges the user interface 50 of FIG. 2 using the blue markers/indicators. For example, the peg 86 could be color coded blue and be positioned to move the process selection switch 52 to the "MIG" setting. Similarly, the suction indicator 87 and magnetic indicator 88 could be color coded blue and arranged as illustrated proximate to the output selection switch 56 and control selection switch 58, respectively, to indicate that both switches 56, 58 should be in the "remote" position during the MIG welding process. In this case, the operator can control the MIG welding process from a remote user interface, such as may be included on the wire feeder 46 of FIG. 1. To further facilitate proper setup and workflow, a color coded workflow reference guide or book (not shown) may be provided.

Figure 3:
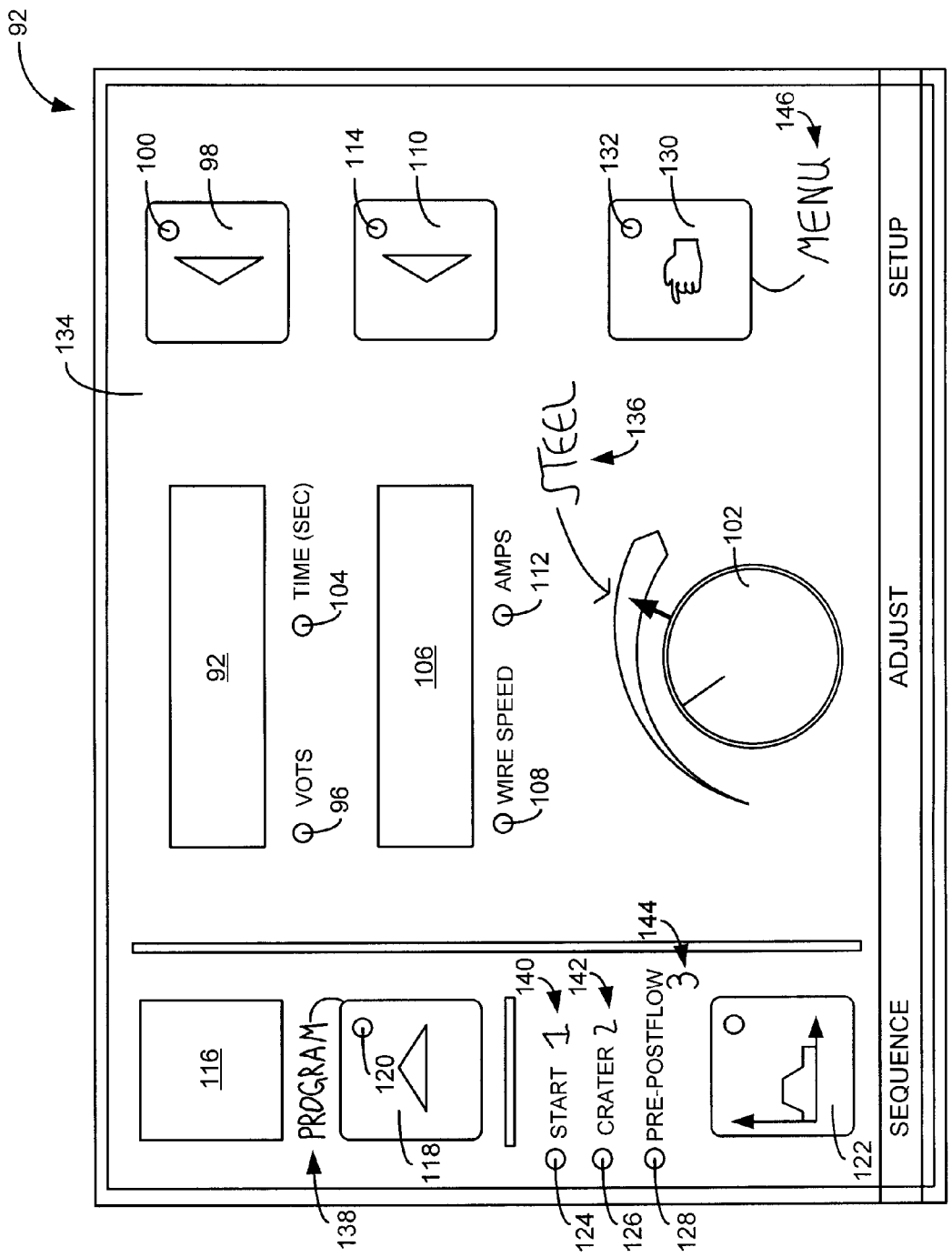
FIG. 3 is a detailed front elevational view of a user interface for a wire feeder included in the welding-type system of FIG. 1 including the workflow/parameter tracking system in accordance with the present invention.

Referring now to FIG. 3, a wire feeder user interface 92 is illustrated. While the illustrated wire feeder user interface 92 is relatively complex and includes a variety of interface devices, it is contemplated that the present invention is equivalently applicable to any wire feeder user interface and, particularly, less complex wire feeder user interfaces that are commonly included with wire feeders. Similarly, in the case of induction heaters, the present invention may be associated with a user interface of a remote pendant control.

The user interface 92 includes an upper display 94 configured to display voltage and/or time information. Specifically, when displaying voltage information on the upper display 94, a voltage labeled light emitting diode (LED) 96 is illuminated. An upper display button 98 can be depressed to display or adjust weld time. An upper display button LED 100 accompanies the upper display button 98 to indicate when information displayed in the upper display 94 may be adjusted by an adjustment control 102. By rotating the adjustment control 102 it is possible to increment or decrement the selected item. To change the information displayed on the upper display 94 from voltage to time information relating to the duration of a welding sequence, the upper display button 98 can be depressed and the voltage LED 96 is turned off in favor of a time LED 104.

A second, lower display 106 is also included. The lower display 106 displays wire feed speed (WFS) or amperage (current) information. When displaying WFS, a WFS LED 108 is illuminated. Accompanying the lower display 106 is a lower display button 110 that may be depressed to display, input, or allow adjustment of either the WFS or current. The lower display button 110 can be used to cause the lower display 106 to display current in amps. If current is displayed, an Amps LED 112 is illuminated. A lower display button LED 114 is illuminated to indicate when it is possible to adjust the information displayed in the lower display 106. When the lower display button LED 114 is illuminated, the adjustment control 102 can be used to adjust the value of the displayed item, that is, WFS or current.

A program display 116 is also included in the wire feeder user interface 92. The program display 116 is dedicated to displaying information relating to the active or queued programs. A program button 118 allows a user to activate a program select feature. By pressing the program button 118 and rotating the adjustment control 102 the user can cycle through and select various welding programs. A display button LED 120 is illuminated to indicate when the adjustment control 102 is enabled to adjust a program displayed in the program display 116.

A sequence button 122 is included to allow user selection of welding sequences. Accompanying the sequence button 122 are LEDs that correspond to sections of the welding sequence. Specifically, the user interface 92 includes three LEDs that indicate whether the welding sequence is in one of three sections of the welding sequence: start 124, crater 126, or pre-postflow 128.

Finally, a setup button 130 is included that allows a user to select the mode of operation. The setup button 130 allows the user to cycle through a plurality of menus. In one embodiment, the menus include a mode menu, a run-in menu, a burn-back menu, and a units menu. The mode menu allows a user to make a mode selection. For example, the mode selection may include modes of constant current or constant voltage. The set up button 130 includes an LED 132 that indicates when the adjustment control 102 can be used to change setup parameters or cycle through setup menus.

In a manner similar to that described with respect to FIG. 2, it is contemplated that the wire feeder user interface 92 may include one or more marking surfaces. In the illustrated embodiment it is contemplated that each of the above-described user-interface devices may be surrounded by a common marking surface. That is, it is contemplated that a bezel extending about the above-described user-interface devices may form a marking surface 134. Accordingly, a user or operator may create marks 136-146 about any user-interface device to indicate the functionality of a given user-interface device, a particular workflow, and/or a desired setting. For example, the marking surface 134 can be used to indicate a desired setting for a particular welding process, for example, the voltage or amperage setting when performing a welding-type process on a steel workpiece 136. In this case, it is contemplated that the above-described LEDs 96, 100, 104, 108, 112, 114, 120, 124, 126, 128, 132 may be color coded, such that particular markings 136 may be similarly color coded to indicate that the setting recorded by the marking 136 corresponds to a particular operational parameter indicated by a specific LED 96, 100, 104, 108, 112, 114, 120, 124, 126, 128, 132. Additionally, it is contemplated that the marking surface 134 may be marked 138, 146 to indicate operational functions of a particular user-interface components. Furthermore, the marking surface 134 may be used to record 140, 142, 144 the order of operational workflows.

The above-described system and method allows an operator to mark, record, and store specific settings for each user interface device of a welding-type system. Specifically, a variety of marking systems and parameter recording systems are provided that are coupled directly with each specific user interface device.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

I claim:

1. A welding system comprising:
a housing forming an enclosure;
a power supply arranged within the enclosure and configured to deliver welding-type power during a welding-type process;
a user interface including at least one user interface device configured to select operational parameters of a welding process;
a bezel integrated into the housing and forming a marking surface that extends about at least a portion of a periphery of the at least one user interface device to display user markings and allow the user markings to be selectively erased, wherein the marking surface includes:
a touch-responsive display element configured to display a mark indicating a desired setting of the at least one user interface device in response to contact by a hand of a user along an area of the touch-responsive display corresponding to the desired setting, and
a dial setting gradient; and
wherein the at least one user interface device includes a dial comprising at least one pointer coupled with the dial and independently movable with respect to the dial to indicate a desired dial setting and the dial extends over a portion of the dial setting gradient.

2. The welding system of claim 1 wherein the marking surface forms a dry erase marker board.

3. The welding system of claim 1 wherein the user markings include at least one of a dry erase marker, chalk, and a grease marker.

4. The welding system of claim 1 wherein the bezel includes a plurality of holes configured to receive pegs indicating desired settings of the at least one user interface device.

5. The welding system of claim 1 wherein the marking surface has a sufficient permeability to receive magnets arranged about the periphery of the at least one user interface device indicating desired settings of the at least one user interface device.

6. The welding system of claim 1 wherein the bezel is sufficiently continuous to receive suction indicators arranged about the periphery of the at least one user interface device indicating desired settings of the at least one user interface device.

7. The welding system of claim 1 wherein the bezel extends along peripheries of a plurality of interface devices to display user markings indicating at least one of a setup process and a workflow process designed to carry out the welding process.

* * * * *